United States Patent
Heath et al.

(10) Patent No.: US 6,350,614 B1
(45) Date of Patent: Feb. 26, 2002

(54) SYSTEM FOR THE ION EXCHANGE PURIFICATION OF HYDROXYLAMINE

(75) Inventors: Brian D. Heath, Harleysville; Rosemarie Carr, Trexlertown, both of PA (US)

(73) Assignee: Concept Sciences, Inc, Allentown, PA (US)

( * ) Notice: Subject to any disclaimer, the term of this patent is extended or adjusted under 35 U.S.C. 154(b) by 0 days.

(21) Appl. No.: 09/499,506

(22) Filed: Feb. 7, 2000

(51) Int. Cl.⁷ ............................................. C01B 21/20
(52) U.S. Cl. ........................ 436/55; 423/387; 210/685
(58) Field of Search ............................ 436/55; 564/301, 564/2; 208/72; 423/360, 359, 387; 422/148

(56) References Cited

U.S. PATENT DOCUMENTS

| | | | | |
|---|---|---|---|---|
| 4,088,740 A | * | 5/1978 | Gaines | 423/359 |
| 4,147,623 A | * | 4/1979 | Koff et al. | 210/672 |
| 4,166,842 A | * | 9/1979 | Tunick et al. | 423/387 |
| 4,202,765 A | * | 5/1980 | Koff et al. | 423/387 |
| 4,230,680 A | * | 10/1980 | Becker et al. | 423/360 |
| 4,264,566 A | * | 4/1981 | Giles et al. | 423/359 |
| 4,624,842 A | * | 11/1986 | Grotz, Jr. | 423/360 |
| 4,749,469 A | * | 6/1988 | Beerbaum | 208/72 |
| 4,963,338 A | * | 10/1990 | Zardi et al. | 423/360 |
| 5,318,762 A | * | 6/1994 | Cawfield et al. | 423/387 |
| 5,352,428 A | * | 10/1994 | Bhatka et al. | 423/360 |
| 5,681,477 A | * | 10/1997 | Leavitt | 210/672 |
| 5,762,897 A | * | 6/1998 | Chang et al. | 423/387 |
| 5,788,946 A | * | 8/1998 | Riddle et al. | 423/387 |
| 5,808,150 A | * | 9/1998 | Michelotti | 564/2 |
| 5,833,844 A | * | 11/1998 | Leavitt | 210/142 |
| 5,872,295 A | * | 2/1999 | Michelotti et al. | 564/301 |
| 6,132,687 A | * | 10/2000 | Noe | 422/148 |

* cited by examiner

*Primary Examiner*—Jill Warden
*Assistant Examiner*—Brian Sines
(74) *Attorney, Agent, or Firm*—John Lezdey

(57) ABSTRACT

The invention provides a system for monitoring and controlling an exothermic reaction in an ion exchange process involving a liquid containing a composition capable of producing an exothermic reaction to control a continuous or a rapid evolution of heat and avoid the generation of excessive gaseous decomposition products which can produce pressure "bursting" forces within a closed container. The system has at least one ion exchange unit, temperature detecting units for reading the temperature of each of the ion exchange units and for providing a temperature signal when the temperature is in a preselected range and a quenching system which may be manually or automatically activated.

12 Claims, 1 Drawing Sheet

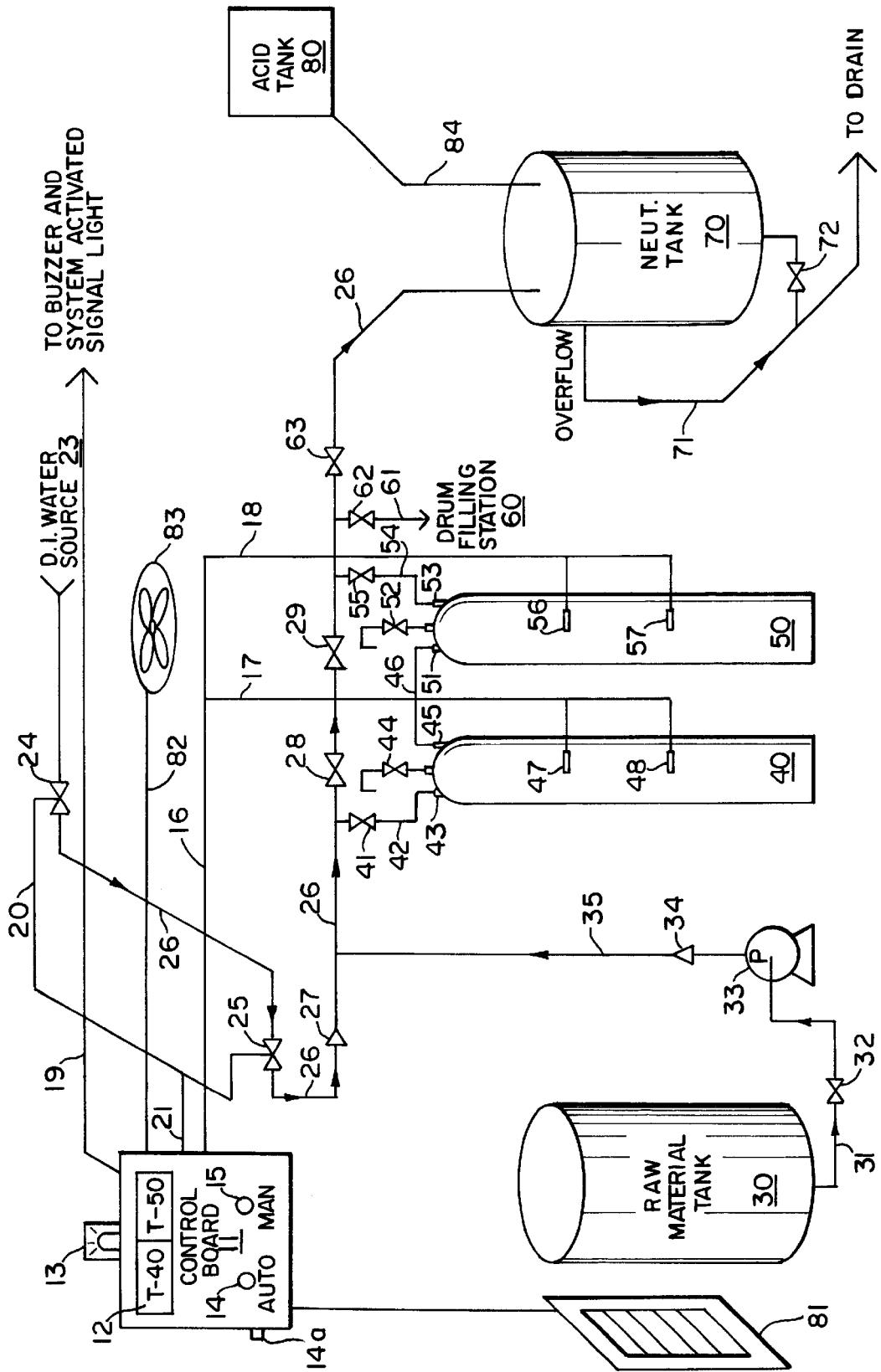

SYSTEM FOR THE ION EXCHANGE PURIFICATION OF HYDROXYLAMINE

BACKGROUND OF THE INVENTION

1. Field of the Invention

A system for monitoring and controlling exothermic reactions in an ion exchange process and more particularly for use in the ion exchange purification of solutions of hydroxylamine.

2. Description of the Prior Art

The use of ion exchange for purifying hydroxylamines is well known. However, resin conditioning and regeneration in the purification processes of the prior art have not dealt with the reduction of trace metals or the possibility of exothermic reactions resulting from the decomposition of hydroxylamine or other organic compounds which may be unstable.

Unstablized solutions of hydroxylamine are inherently prone to decomposition, since the compound functions both as an oxidizing agent and a reducing agent. It decomposes by internal oxidation-reduction to form gaseous products, i.e. ammonia and nitrogen or oxides of nitrogen and water. The "redox" decomposition is accelerated by a high pH and the presence of catalytic amounts of certain multivalent heavy metals such as iron, nickel, copper, manganese and chromium. Other compounds such as mercaptans, typical oxidizing and reducing agents, oxygen and heat can also initiate complete decomposition of hydroxylamine which can be rapid under certain condition such as high levels of catalyic trace metals, elevated temperatures plus absence of an effective stablizer.

Additionally, the order of ion exchange is critical to maintaining stability of the hydroxylamine within the ion exchange cylinder. It has been found that anion exchange followed by cation exchange can lead to delayed, but then rapid decomposition of hydroxylamine and produce consequences of significant pressure build-up within the cation resin cylinder which can lead to a "bursting" of the cylinder, and cylinder head. Errors by workers in following the prescribed ion exchange order can result in such pressure build-up and potential "bursts".

The decomposition of hydroxylamine is an exothermic reaction which propagates the continuing decomposition process. The production of heat during this decomposition of the hydroxylamine is effective at producing further decomposition, which in turn may produce additional heat. Once effectively initiated, the decomposition can become auto-catalytic under certain conditions.

SUMMARY OF THE INVENTION

In accordance with an aspect of the present invention, there is provided a system for monitoring and controlling any liquid containing a composition or reactants capable of undergoing an exothermic reaction in an ion exchange process which comprises a "monitor" means for receiving and monitoring a temperature signal from each ion exchange unit and for providing processible values indicative of the magnitude of the temperature, data processing means for reading the temperature signal in a pre-established processible manner, means for detecting if one or more of the ion exchange units exceeds pre-established thermal limits indicating that an exothermic reaction is taking place and thereby providing control signals for controlling the temperature of the ion exchange process and for activating either visual or audible alarms or both, means for controlling the flow of an inert quenching fluid into each unit which exceeds the pre-established temperature limits to quench the reaction and lower the temperature of each overheated unit to acceptable temperature levels and control means for automatically resetting the means for controlling the flow of the inert fluid and the alarm means.

An important feature of the invention is that the monitor means continuously monitors the temperature signals and continuously provides a data processing value indicative of the temperature from each ion exchange unit and is operatively associated with a data processing means. The temperatures of each unit are detected through a series of thermal probes which are insulatively attached and in full contact with the outside top and bottom of each ion exchange unit and are operatively connected through a monitor means to digital thermostats. The monitor means provides a digital read-out for each ion exchange unit, thus, the exact location of each problem "hot" unit can be pin-pointed. The digital thermostats each have manually set temperature limits in response to which of the various components of the system of this invention are activated.

In accordance with the present invention, the system of monitoring and regulating exothermic reactions in an ion exchange process can be useful for any liquid containing a compound, composition or reactants capable of undergoing an exothermic reaction such as the simple mixing of acid or caustic with water. More particularly, this invention is directed to the ion exchange purification of an aqueous or non-aqueous solution containing hydroxylamine or at least a neutralized hydroxylamine salt. As mentioned above, the solutions of unstablized hydroxylamine are inherently prone to decomposition and must be closely monitored especially in a closed vessel to avoid an excessive build-up of gases and, therefore, pressure with an attendant increase in temperature. These gaseous decomposition products can produce pressures within closed containers which can yield "explosive" pressures over time dangerous to operators and destructive to equipment.

The system of the present invention may be operated in an automatic mode or in a manual mode.

A method for operating the system and for setting operating limits (i.e. "alert" and "alarm" limits) is also disclosed.

It is, therefore, a primary object of the invention to provide a system for monitoring and controlling liquid temperature in a medium containing a compound composition or reactants capable of undergoing an exothermic reaction whether or not gaseous products are reduced.

It is another object of the invention to provide a system for monitoring and controlling (i.e., through an automatically activated quenching system) an excessive thermal build-up in an ion exchange process treating a liquid containing a compound, composition or reactants capable of undergoing an exothermic reaction whether or not gaseous products are produced.

It is a further object of the invention to provide a system which can pin-point an excessive thermal build-up in an ion exchange treatment process beyond a pre-set temperature limit containing a solution capable of undergoing an exothermic reaction whether or not gaseous products are produced.

It is a further object of the invention to provide a system which can pin-point an excessive thermal build-up from an exothermic reaction beyond a pre-set temperature limit to a specific location in a series of ion exchange units and provide means to quench the exothermic reaction.

It is yet a further object to provide a process to monitor and regulate a liquid containing a compound or composition capable of undergoing an exothermic reaction while in storage.

Still another object is to provide a system to monitor and regulate the ion exchange purification of solutions of hydroxylamine.

It is a still further object of the invention to provide a purification system with a reduced hazard of closed container pressure "bursting" (i.e., explosion) from continuous decomposition of hydroxylamine over time within a closed or possibly vented ion exchange unit.

These and other objects of the present invention will become apparent to those skilled in the art upon a reading and understanding of the specification together with the attached drawing.

BRIEF DESCRIPTION OF THE DRAWING

The invention may take physical form in certain devices and arrangement of devices, a preferred embodiment of which will be described in detail in the specification and illustrated in the accompanying drawing which forms a part hereof and wherein:

The drawing is a schematic representation of a preferred embodiment of the invention showing a flow diagram of a system for ion exchange purification of a solution of hydroxylamine.

DETAILED DESCRIPTION OF THE PREFERRED EMBODIMENTS

According to the present invention, there is provided a system for monitoring and controlling an exothermic reaction in an ion exchange process. Specifically, there is provided the purification of hydroxylamine whereby the resulting product has greatly reduced amounts of undesirable cations and anions with a greatly reduced chance of a pressure build-up from the continuous decomposition of hydroxylamine within a closed or vented ion exchange unit.

In a preferred embodiment, the purification of hydroxylamine as disclosed in U.S. patent application Ser. No. 09/023,940 filed Feb. 13, 1998, now U.S. Pat. No. 5,872,295, entitled PURIFICATION OF HYDROXYLAMINE filed by Francis Michelotti and Irl E. Ward and assigned to the same assignee as the present application and whose disclosure is incorporated by reference herein, is the preferred process for utilizing the present invention to insure optimum safety to the operator and in protecting equipment and property.

According to the aforementioned application, there is provided the purification of hydroxylamine whereby the resulting product has greatly reduced amounts of undesirable cations and anions. The invention provides a process whereby an aqueous solution of hydroxylamine is passed through at least one bed of a strong acid cation exchange resin and then at least one bed of a strong base anion exchange resin. Preferably, the cation exchange resin is pretreated with a dilute solution of hydrochloric acid so that all acid groups are in the hydrogen (H) form and to ensure that all metallic cations that may be present are extracted from the resin bed. The hydrochloric acid treatment is with a 3–20% hydrochloric acid solution, preferably, with about 5–10% hydrochloric acid solution.

The strong base anion exchange resin is pretreated typically with deionized water or regenerated with a non-metal amino or a hydroxide base solution so as to remove any undesirable anions which may be present on the resin that can contaminate the introduction of the hydroxylamine solution. Also, this ensures that the active sites of the resin are in the hydroxyl ($OH^-$) form.

Using conventional methods of pretreatment of cationic exchange resins, such as with dilute sulfuric acid does not produce the same results as found when dilute hydrochloric acid has been used to pretreat or regenerate the resin. In accordance with the invention, it is preferred to also pretreat the cation exchange resin with a dilute solution of hydroxylamine, such as a 5–40% aqueous solution, preferably, about 10–25% by weight solution of hydroxylamine before passing a 50% by weight solution of hydroxylamine through one or more beds of the cation exchange resins. An exothermic reaction is present when the hydroxylamine solution is first added to the cation exchange bed so that it is preferable to utilize a dilute hydroxylamine solution to condition the cation exchange resin by forming the hydroxylamine salt with the strong acid groups (i.e. acid-base reaction which forms heat). The dilute hydroxylamine solution also has the effect of removing excess metal cations that were not effectively removed by the hydrochloric acid treatment, i.e., calcium. The 50% aqueous hydroxylamine solution if initially utilized without the "dilute" pretreatment, generates a highly exothermic reaction with the cation exchange resin in producing the corresponding amine salt that is capable of affecting the resin bed. This exothermic "acid base" reaction can also be controlled by a predetermined rate of introduction of the hydroxylamine solution. Once the amine salt has been formed on the active resin sites using the diluted HA conditioning step, the $Na^+$, $K^+$ and other cations in the 50% hydroxylamine solution exchange in the resin bed very satisfactorily.

It has been found that the order or permutation of exchange of aqueous solutions of hydroxylamine is critical to the long-term stability of the remaining hydroxylamine within the ion exchange column following the purification run. The order of ion exchange of aqueous hydroxylamine solutions is also critical to the safe operation of the exchange system because continuous decomposition of the hydroxylamine can take place over time (i.e., typically 2 to 4 days) with a strong thermal build-up during the later stages of the decomposition period. It is therefore important that the exchange order for the hydroxylamine solutions should not include anion exchange followed by cation exchange.

The non-metal amino or hydroxide base compounds which may be used to regenerate the anion exchange resin includes ammonium hydroxide solutions, tetraalkyl ammonium hydroxide solutions, for example, tetramethyl ammonium hydroxide, tetraethylammonium hydroxide, alkanolamines, for example, monoethanolamine, isopropylamines, diethanolamine, 2-amino-1-propanol, 2-amino-2-ethoxy-propanol, etc., hydroxylamine solutions, and the like.

Most commercial ion exchange resins, both anionic and cationic, require an initial cleaning or conditioning prior to use. If the cleaning or conditioning is not performed, excessive metal extraction from the resin by hydroxylamine may take place. In the situation where the $Na^+/K^+$ content values in the traversing hydroxylamine solution are reduced but the calcium values increase, this is an indication that the resin is initially high in calcium ions which are being removed by the traversing aqueous hydroxylamine solution. This means that additional cleaning or conditioning of the resin bed is required.

Both gel type and macroporous type of ion exchange resins can be used in the present process. Preferred are the polystyrene and polyacrylic acid strong acid hydrogen form cationic exchangers and the strong base anion exchangers of the polystyrene or polyacrylic type and hydroxyl ($OH^-$) form. Most preferred are the sulfonated polydivinylbenzene/ styrene cationic resins and the tetramethylammonium hydroxide modified poly (divinylbenzene/styrene) copolymers as the anion exchange resins.

The weak acid type cation exchangers and the weak base anion exchangers either alone or in combination have been found less effective in reducing both the cation and anion impurities found in the hydroxylamine solutions which are commercially produced.

The anion exchange resins which may be utilized in the present invention include the Purolite anion exchange resins A-600, A-400, A-300, A-300E, A-400, A-850 and A-87, Rohm & Haas resins IRA-400, IRA-402, IRA-904 and IRA-93, Dow resins SBR, SAR, Dowex 66 and Dowex II, Ionac ASB-1, Duolite A-109 and the like in the OH⁻ form.

Preferably, the 50% hydroxylamine solution is passed through a sufficient number (banks of about 3–4 cylinders of about 2.5 ft$^3$ each) of the prepared cation exchange units and anion exchange units (banks of about 3–4 cylinders of about 2.5 ft$^3$ each) which are sequentially connected in series flow so that the required quality of the hydroxylamine solution can be obtained without frequent regeneration. These last two parameters are controlled by the volume in cubic feet of the resin used within each ion exchange cylinder.

Referring to the drawing wherein the purpose is for illustrating a preferred embodiment of the invention only and not for the purpose of limiting the same, it shows a system 10 and a process for monitoring and regulating excessive heat build-up in ion exchange process. Broadly stated, system 10 includes a control board 11 which houses operatively interdependent and interconnected controls for temperature detection, temperature control with flushing control means such as solenoid valves 24 and 25 and alarm systems including room light (not shown), light 13, a quenching liquid holding tank (optional), a cation ion exchange unit 40, an anion exchange unit 50, a drum filling station 60 and a neutralization tank 80. These components are generally in an enclosed space 100 with provisions for ventilation, for example, through damper 81 and exhaust fan 83. Additional alarm means such as buzzer and a system activated signal light are located outside of the facility enclosed space.

Referring to the operation of system 10, as pointed out previously, before start-up, it is essential to pretreat the cation exchange resin in ion exchange cylinder 40 with a dilute hydrochloric acid followed by a DI water or distilled rinse to pH~7.0 for the rinse water and then a dilute solution (i.e., preferable 10–25%) of hydroxylamine to form the hydroxylamine salt with the active acidic resin sites. This procedure reduces the probability of a premature exothermic "acid-base" reaction from the initial mixing of "basic" hydroxylamine with the "acidic" resin within the cylinder. The procedure also extracts the remnants of the metal cations not removed by the hydrochloric acid treatment. Alternatively, the premature exothermic "acid-base" reaction can also be avoided by a predetermined rate of introduction of the hydroxylamine solution.

With ball valves 32, 41, 55 and 62 manually opened and ball valves 28, 29, 63 and 72 manually closed, a feed stream of raw 50 weight percent of an aqueous hydroxylamine solution containing contaminants such as ions or ionic compounds of aluminum, calcium, chromium, iron, potassium, sodium, silicon, and the like is transferred from holding tank 30 via line 31 through ball valve 32 by pump 33 through check valve 34 to lines 35 and 26. From line 26, the hydroxylamine solution flows through ball valve 41 and line 42 into inlet port 43 of cation exchange cylinder 40 containing a strong acid cation resin pretreated with a dilute solution of hydrochloric acid and then rinsed with DI water or distilled water, followed by a dilute solution of hydroxylamine. The cation exchanger 40 has a temperature detecting means attached in full contact with the outside of the cylinder such as top thermocouple 47 and a bottom thermocouple 48 which are operatively connected with monitoring means housed in control board 11 to provide temperature signals thereto. The cylinder 40 is also provided with a pressure relief device 44 such as a conventional pressure relief valve to vent any and all excessive pressure within the cylinder caused by such hydroxylamine decomposition to the atmosphere. The hydroxylamine solution flows downwardly through an HDPE or polypropylene feed tube which empties into the resin filled cylinder at the bottom. The hydroxylamine solution then passes through the cation exchange bed and then upwardly out through outlet port 45. The hydroxylamine solution continues in series flow through line 46 to anion exchanger 50 through inlet port 51. Anion exchanger cylinder 50 is similarly equipped as is cation exchanger 40, i.e., having temperature detecting means such as thermocouples 56 and 57 and pressure relief valve 52. In anion exchanger 50 the hydroxylamine solution passes downwardly through an HDPE or polypropylene feed tube which empties into the resin filled cylinder at the bottom. The hydroxylamine solution then passes through the anion exchange resin and upwardly to outlet port 53 through ball valve 55 to line 26. Following the double ion exchange of the hydroxylamine solution, the purified hydroxylamine passes through ball valve 62 and then to drum filling station 60.

Preferably, an effective amount of a stabilizer should be added to the treated hydroxylamine solution. Suitable stabilizers such as disclosed in U.S. patent application Ser. No. 08/910,533, filed Aug. 14, 1997 entitled, STABILIZATION OF HYDROXYLAMINE, by Frank Michelotti and assigned to the same assignee as the present application and whose disclosure is incorporated by reference herein, include a compound selected from the group consisting of cis- or trans-1,2-diaminocycloalkyl-N,N,N$^1$, N$^1$-tetracetic acid; diethylenetriaminopentaacetic acid; ethylene-bis-(oxyethylelenitrilo) tetraacetic acid, cis- or trans-1,4-diaminocycloalkyl-N,N,N$^1$,N$^1$-tetraacetic acid, bis-hexamethylenetriamine pentaacetic acid hexamethylenediaminetetraacetic acid, tris-(2-aminoethyl) amine-hexaacetic acid, iminodiacetic acid, and the like.

The cis- or trans-1,2-diaminocycloalkyl-N,N,N$^1$,N$^1$-tetraacetic acid can be either cis- or trans- or a combination of cis- and trans 1,2-diaminocyclo-heptane-N,N,N$^1$,N$^1$-tetraacetic acid, cis-or trans-1,2-diaminocyclo-pentane-N,N, N$^1$,N$^1$-tetraacetic acid, cis-or trans-1,2-diaminocyclo-hexane-N,N,N$^1$,N$^1$-tetraacetic acid, or mixtures thereof.

The cis- or trans-1,4-diaminocycloalkyl-N,N,N$^1$,N$^1$-tetraacetic acid can be with a combination of cis- and trans 1,4-diaminocyclo-heptane-N,N,N$^1$,N$^1$-tetraacetic acid, cis- and trans-1,4-diaminocyclo-pentane-N,N,N$^1$,N$^1$-tetraacetic acid, cis- or 1,4-diaminocyclo-hexane-N,N,N$^1$,N$^1$-tetraacetic acid, or mixtures thereof.

The amount of stabilizer to be used to stabilize the hydroxylamine or the at least partially neutralized hydroxylamine salt solution ranges from about 0.005 to about 0.1 percent by weight of composition. Preferably, the amount of stabilizer ranges from about 0.005 to about 0.025%, (50–250 ppm) same basis.

While the ion exchange purification process of aqueous hydroxylamine is "on-stream" there is little concern of any from hydroxylamine decomposition. However, when the liquid flowing in and flowing out of the exchanger is stopped, the hydroxylamine solution is susceptible to decomposition over many hours or days. The decomposition of the stagnant hydroxylamine solution occurs slowly at first but after a period of about 24 to 48 hours, the heat build-up may rise quickly. Without proper monitoring and the control of the evolution of the heat and excess pressure from gaseous by-product build-up in a closed cylinder, "explosive" pressure-relief forces can result. Generally, the exothermic and pressure problems are associated with the cation exchanger containing anion exchanged hydroxylamine. However, such exothermic decomposition over time may also occur within the anion exchange cylinder.

The temperature monitoring/control-flushing system, which is the core of the present invention is designated by reference numeral 20, comprises: temperature detecting means; monitoring means for setting the same temperature limits for each temperature detecting means; control means receiving and monitoring temperature signals; data processing means for receiving monitoring signals and based on the monitoring signals, providing a preselected signal to activate the alarm means to open the solenoid valves 24 and 25 to introduce deionized water at a fast rate into the ion exchange units. The data processing means also housed in control board 11 provides signals based on the monitoring signals, to close the solenoid valves and to reset the visual alarms (room lights and indicator light 13).

The temperature detecting means such as thermocouples 47, 48, 56 and 57 are positioned near the top and bottom on the outside wall of each respective ion exchange cylinder. Alternatively, the thermal probes can be placed inside of the cylinder positioned near the top and bottom. Other suitable thermal detectors include thermometers, thermistors, thermal sensitive coatings, thermal sensitive substrates or papers, et al. The thermocouples provide temperature signals to the monitor means including preset thermostats (not shown) from each ion exchange cylinder. In fact, two signals, i.e., from the top and bottom of each cylinder are generated, transferred and received by the monitor means.

The monitor means has the capacity for establishing a temperature limit range for each thermal probe, for receiving and monitoring the temperature signals from each of the thermocouples and continuously provides to the data processing means data processing values indicative of the magnitude of the temperature from each of the thermocouples. The data processing means for processing the temperature signals from the monitor means comprises a microprocessor. Prior to start-up, the operator sets an "alert" temperature limit in the manual mode (switch 15) or an "alarm" temperature limit in the automatic mode (switch 14). These limits define a range of temperatures of about 25° to 35° above the ambient temperature. Typical ion exchange runs for many different solution/liquid types can cause cylinder temperatures to increase 5° to 15° above ambient temperatures as a simple function of the exchange process. Water flushes following resin exhaustion and regeneration procedures can cause cylinder temperatures to increase 10° to 20° from the ambient temperature. Thus, the range of pre-established temperature limits should not be set so narrowly above the ambient temperatures to cause system activation from normal plant activities. However, a pre-established temperature if set too high can result in excessive decomposition of the hydroxylamine solution without the activation of the system (20) in time to stop the rapid phase of the decomposition rate within the closed cylinder which can result in pressure "bursting" consequences.

Both set temperatures (i.e., "alarm" and optionally, "alert") and current process read-out temperatures are digitally displayed in panel window 12. Additionally, the temperature data may be print recorded relative to time-temperature-date.

In the automatic mode (switch 14), which would usually be used during a plant shut-down, once the "alarm" temperature is set in the thermostat and transferred to the memory location of the microprocessor in the data processing means, the temperature signals from the monitor means are processed in this pre-programmed manner. In the event that the data processing means interprets that one or more of the temperature signals exceeds set "alarm" limits, a control signal is generated to activate a means for introducing a quenching liquid to flush the ion exchange treating units. In preparation for a plant shut-down, ball valves 32, 28, 29 are manually closed, pump 33 is shut off and ball valve 63 is opened.

Referring to the drawing, in one preferred embodiment of the invention and the process described above, the means for controlling an exothermic reaction is described in which each step is automatically operated in the following sequence. Responsive to a signal from the monitoring means which shows that one or more ion exchange units exceed the pre-established limits indicating an exothermic reaction, the buzzer and warning light are activated through electrical circuit 19. Simultaneously room lights (not shown) are turned on, the damper 81 is opened and the exhaust fan 83 is activated through electrical circuit 82 to allow air from outside of the enclosure 100 to enter providing make-up air for exhaust fan 83. The main solenoid valve 24 is opened by an electrical circuit and deionized water from an inline pressurized deionized water source 23 flows through line 26 to cylinder flush solenoid valve 25 opened by signals transmitted through electrical circuit 20 through check valve 27 to ball valve 41 through inlet port 43 into cation exchanger 40 to quench the exothermic reaction and to reduce the temperature of the cylinder 40. The flushing is continued to displace the gaseous reaction products and reaction medium through outlet port 45 and in series flow to connecting line 46 to inlet port 51 of anion exchanger 50.

The flushing and displacement continues through the anionic exchanger 50 flowing through outlet 53 to line 54 through ball valve 55 to line 26. With ball valve 62 closed the effluent bypasses drum filling station 60 and is passed through ball valve 63 through line 26 to a large polypropylene or a high density polyethylene neutralization tank 70 to drain through valve 72. The neutralization tank contains a dilute solution of about 2–15 weight percent of a neutralizing acid such as citric acid, hydrochloric acid, phosphoric acid, sulfuric acid, et al. This acid neutralization step converts the remaining decomposing hydroxylamine in the effluent solution to the corresponding hydroxylamine salt on contact, which immediately stops all decomposition in progress. The solution of the hydroxylamine salt is not hazardous and is passed to overflow line 71 for disposal to a sewer line without any environmental impact. Tank 80 provides acid make-up to the neutralization tank 80 through line 84 in amounts necessary to maintain the proper concentration of acid in the tank.

The deionized water flush is continued through the system for about 5 minutes beyond the point at which the temperature of the cylinder falls below the set "alarm" temperature. If the cylinder temperature rises again after the termination of the flushing operation, the flush system will automatically reactivate once the cylinder exceeds the set alarm limits. This flush-stop-flush-stop sequence will continue automatically until cylinder temperature stabilizes below the set alarm temperature limits. Once the cylinder temperatures are stabilized, the system automatically resets when the falls temperature limits below the set "alarm" temperature limits. The buzzer and warning light must be reset manually. Ball valve 62 requires manual opening once the purification system 10 is put back on stream.

In the manual mode, an "alert" temperature range (optional) is set along with the "alarm" temperature through the monitor means, in the memory location of the microprocessor in the data processing means. The upper and lower "alert" limits define a temperature range below the temperature range of the "alarm limits." Generally, the "alert" temperature ranges from about 15° to 20° above the ambient which when exceeded will alert an operator with a flashing light 13 and by an audible alarm such as a buzzer and the system activated signal light. The operator will observe the temperature until it reaches the set "alarm" which is set about 25° to 35° above the ambient temperature at which time the operator may engage the emergency button 14a. The engagement of switch 15 would set in motion the same sequence of steps described above relative to the automatic mode of the invention sounding and lighting an alarm when the alarm temperature has been exceeded. Quenching of the exothermic reaction including automatic resetting of the room light monitor means and data processing means plus opening damper 81 and actuation of exhaust fan 83 can only be initiated through emergency button 14a while in the manual mode 15. However, as in the automatic mode, the audible alarm, the system activated signal light and the valve system must be manually reset. Alternatively, the operator through control board window 12, identifies the exchange cylinder or cylinders exhibiting the exothermic behavior and manually repositions the appropriate ball valve within the exchange cylinder system in order to quench only those affected cylinders by subsequently pressing button 14a.

The drawing only shows one cation exchange unit and one anion exchange unit. In plant operation up to about 24 exchange units are employed in the ion exchange purification process. Typically, banks of three or four units of cationic resin exchangers are connected in series followed banks of three or four units of anionic resin exchangers also connected in series. The different banks also interconnected in series flow.

Since instantaneous digital readouts of each of the thermostats are provided in the window panel 12, the operator can pin-point the problem unit or potential problem unit soon after the "alert" alarm is activated. Thus, the ability of the system 10 to particularly point out the exchange unit or units which are overheated (alarm limits) or have the potential to exceed the pre-established temperatures (alert limits) avoids immediate or potential danger from gaseous product build-up. In plant operation where a plurality of units are used, means for avoiding problem units can be employed. For example, by substitution of the problem unit with a fresh exchange unit. Likewise, conventional plumbing techniques can be used to by-pass the problem unit. In each case, the problem exchanger could be individually quenched as described below.

The present invention may be embodied in other specific forms without deporting from the spirit or essential attributes thereof, and accordingly, reference should be made to the appended claim rather than to the foregoing specification, as indicating the scope of the invention.

What is claimed is:

1. A system for monitoring and controlling exothermic reactions in an ion exchange process comprising:

at least one ion exchange unit for treating a liquid containing a composition capable of undergoing an exothermic reaction within the exchange unit;

temperature detecting means for detecting the temperature of each of said ion exchange units and for providing a temperature signal from each said unit;

monitor means including alarm means for receiving and monitoring the temperature signals from each of said temperature detecting means from each of said temperature detecting means by continuously providing to a data processing means values indicative of the magnitude of the temperature from each said unit; data processing means for processing the temperature signals in a pre-programmed manner, including detecting if one or more of the temperature signals have exceeded pre-established temperature limits which is indicative of an exothermic reaction, and providing control signals to said alarm means; means for introducing an inert fluid into the inlet port of at least one ion exchange unit to quench an exothermic reaction in said liquid and reduce the temperature of the unit, the means for introducing being operatively associated with said alarm means whereby control signals to said alarm means also activates said means for introducing; and means for resetting said data processing means, said alarm means and said means for introducing back to normal configuration when said temperature falls below a predetermined temperature.

2. The system of claim 1 wherein the inert fluid also flushes said liquid containing acid composition from said unit.

3. The system of claim 1 wherein said temperature detecting means is selected from group consisting of thermometers, thermocouples, thermistors, thermal sensitive coatings and thermal sensitive substrates.

4. The system of claim 1 wherein the data processing means is a pre-programmed manner and wherein thermostats are used to set pre-established temperature limits.

5. The system of claim 1 wherein said pre-established temperature limits range from about 25° C. to 35° C. above ambient temperature.

6. The system of claim 1 wherein said composition capable of undergoing an exothermic reaction is selected from the group consisting of aqueous solutions of hydroxylamine and non-aqueous solutions of hydroxylamine.

7. The system of claim 1 further comprising means for by-passing a selected ion exchange unit which has exceeded pre-established temperature limits.

8. The system of claim 1 including means for identifying the ion exchange unit undergoing an exothermic reaction.

9. A system for monitoring and controlling exothermic reactions in an ion exchange process comprising:

at least one ion exchange unit for treating a solution containing hydroxylamine;

temperature detecting means for detecting the temperature of each of said ion exchange units and for providing a temperature signal from each said unit;

monitor means including alarm means for receiving and monitoring the temperature signals from each of said temperature detecting means by continuously providing to a data processing means values indicative of the magnitude of the temperature signals from each said unit;

data processing means for processing the temperature signals in a pre-programmed manner, including detecting if one or more of the temperature signals have exceeded pre-established temperature limits which is indicative of an exothermic reaction and providing control signals to said alarm means;

means for introducing deionized water into each inlet port of said at least one ion exchange unit to quench the exothermic reaction in said solution from said unit, the means for introducing being operatively associated with said alarm means whereby control signals to said alarm means also activates said means for introducing; and means for resetting said data processing means, said alarm means and said means for introducing back to normal configuration when said temperature falls below a predetermined temperature.

10. A process for monitoring and controlling exothermic reactions in an ion exchange process having a multiplicity of ion exchange units comprising:

detecting the temperature of each of said ion exchange units and providing a temperature signal from each of said units;

receiving and monitoring the temperature signals from each of said units; continuously providing data processing values indicative of the magnitude of the temperature signals from each said unit;

processing the temperature signals in a pre-programmed manner, including detecting if one or more of the temperature signals have exceeded pre-established temperature limits which is indicative of an exothermic reaction and providing control signals for an alarm means operatively associated with means for introducing a quenching liquid into each inlet port of at least one ion exchange unit to quench the exothermic reaction in said solution in said unit; the means for introducing being operatively associated with said alarm means whereby control signals to said alarm means also activate said means for introducing.

11. The process of claim 10 wherein a hydroxylamine solution is used in the ion exchange process.

12. The process of claim 10 including the step of identifying the ion exchange unit undergoing an exothermic reaction and by-passing said unit.

* * * * *